United States Patent [19]

Williamson

[11] 4,315,554
[45] Feb. 16, 1982

[54] SCALE

[76] Inventor: Glenn E. Williamson, 3912 La Hacienda Dr., San Bernardino, Calif. 92404

[21] Appl. No.: 17,171

[22] Filed: Mar. 2, 1979

[51] Int. Cl.³ .................... G01G 21/08; G01G 23/14
[52] U.S. Cl. ................................. 177/256; 177/172; 177/DIG. 9
[58] Field of Search ................ 177/256, 172, DIG. 9, 177/147

[56] References Cited

U.S. PATENT DOCUMENTS

| 924,962 | 6/1909 | Boling | 177/172 |
| 2,390,696 | 12/1945 | Dimick | 177/172 |
| 3,465,838 | 9/1969 | Kienzle et al. | 177/256 |
| 4,078,623 | 3/1978 | Ohta et al. | 177/147 X |

Primary Examiner—George H. Miller, Jr.
Attorney, Agent, or Firm—Harvey S. Hertz

[57] ABSTRACT

A scale includes an arm system movable about and fixedly secured to a fulcrum. An output detector is coupled adjacent to one end of the arm system. A load structure is utilized to position an item thereon which is to be weighed by the scale. A strain sensor is fixedly connected adjacent the other end of the arm system and the load structure. The strain sensor and fulcrum are formed of resilient material.

5 Claims, 4 Drawing Figures

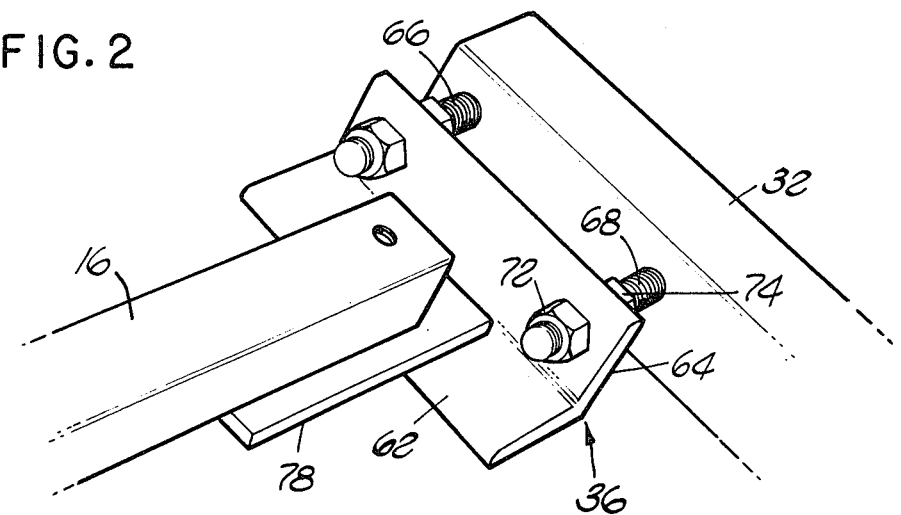
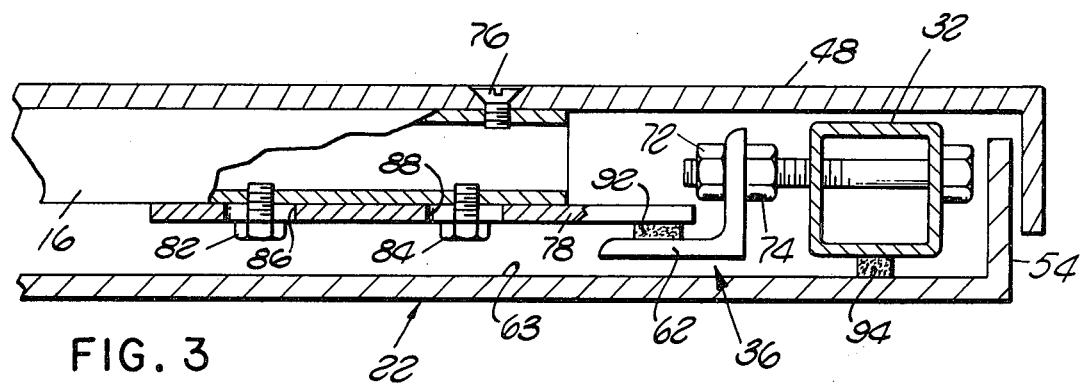
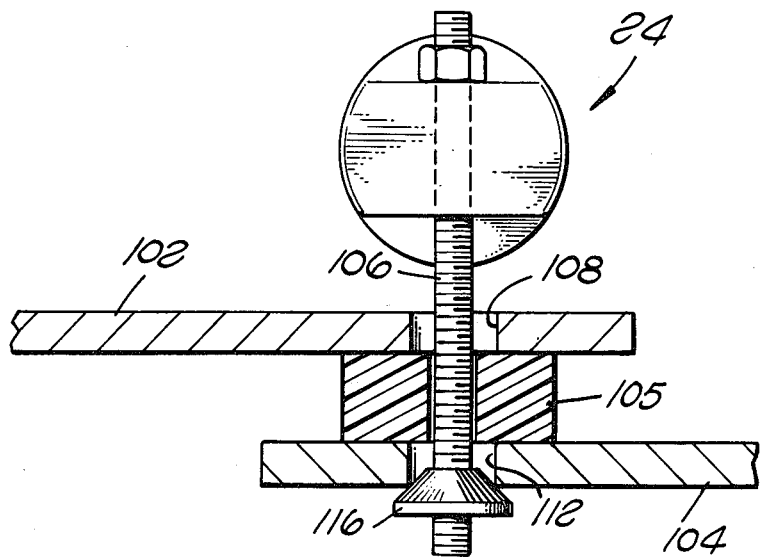

SCALE

BACKGROUND OF THE INVENTION

1. Field of the Invention

The field of art to which the invention pertains includes the field of scales, particularly, wherein critical wear components, such as pivots, bearings, or other delicate flextures are not used in the weighsection.

2. Description of the Prior Art

Conventional scales utilize a balance which includes a central knife edge or pivot, bearings and other delicate flextures. After continuous use, such items tend to wear. Further, shock loading of such systems tends to damage the load cell or sensor.

The present invention utilizes a resilient material which enables the scale to transfer a force without wear. Further, when shock loading does occur, the resilient material aids in absorbing the forces which could damage parts of the system. Moreover, side loading effects and errors are reduced or totally eliminated.

SUMMARY OF THE INVENTION

A scale includes an arm system movable about and fixedly secured to a fulcrum. An output detector is coupled adjacent to one end of the arm system. A load structure is utilized to position an item to be weighed thereon. A strain sensor is fixedly connected adjacent to the other end of the arm system and the load structure. The strain sensor and the fulcrum are formed of resilient material.

The advantages of this invention, both as to its construction and mode of operation, will be readily appreciated as the same becomes better understood by reference to the following detailed description when considered in connection with the accompanying drawings in which like refernce numerals designate like parts throughout the figures.

BRIEF DESCRIPTION OF THE DRAWINGS

FIG. 2 is a partial prospective view of one corner of the system illustrating an adjustment mechanism thereof;

FIG. 3 is a partial cross-sectional view of the scale of FIG. 1; and

FIG. 4 is a partial cross-sectional view of the scale of FIG. 1.

DESCRIPTION OF PREFERRED EMBODIMENTS

Figure 1:
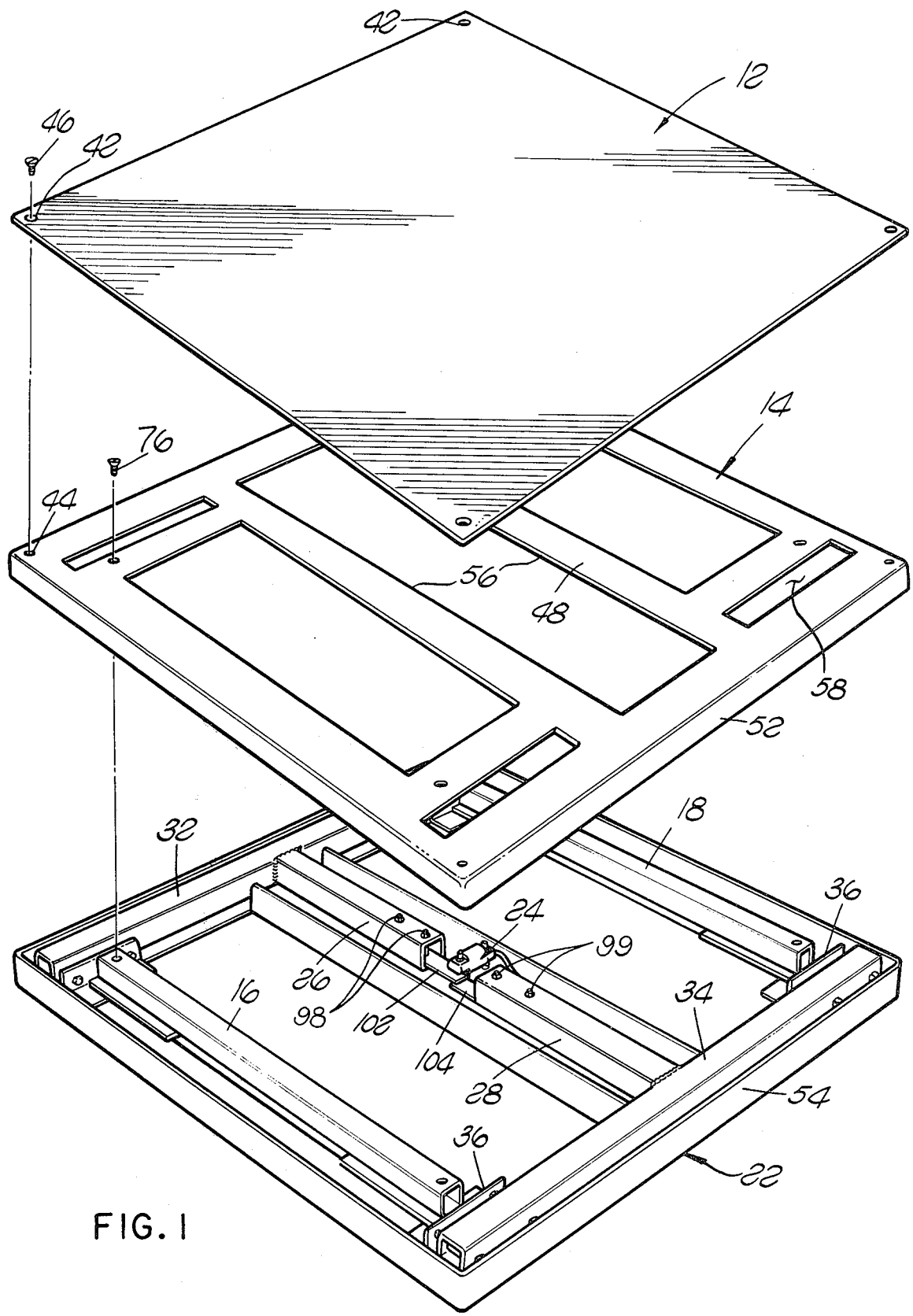
FIG. 1 is a perspective view, partially exploded, of the scale of the present system.

Referring now to the drawings there is shown in FIG. 1 a scale constructed in accordance with the principles of the invention. The scale includes a top deck plate 12 upon which items which are to be weighed by the scale are placed. The top deck plate 12 is positioned directly on a weighbridge 14. The weighbridge 14 in turn is connected to a pair of parallel load struts 16 and 18 positioned on opposite sides of a housing structure 22.

A centrally located output detector 24 in the housing structure 22 is coupled to an arm system including a first stiffener arm 26 and a second stiffener arm 28 formed in the center of the housing structure 22 and parallel to the load struts 16 and 18. One end of each of the stiffener arms 26 and 28 is coupled to the output detector 24 and the other ends are each connected directly to a first end arm 32 and a second end arm 34 at the centers thereof. One end of each of the end arms 32 and 34 are coupled by means of a sensitivity adjustment bracket 36 to respective ends of the load struts 16 and 18.

Referring now to FIG. 1 in greater detail, the top deck plate 12 has openings 42 at the corners thereof which are aligned with openings 44 in the corners of the weighbridge 14 for enabling screws 46 to secure the deck plate 12 to the weighbridge 14. The weighbridge 14 is formed of a top plate 48 whose outer dimensions are approximately equal to the dimensions of the deck plate 12. A downwardly extending flange 52 of the weighbridge 14 is positioned adjacent to the outer surface of the side walls 54 of the housing structure 22 (FIG. 3).

The weighbridge 14 contains a plurality of apertures which form a dual function of reducing the weight of the weighbridge and simultaneously enabling adjustments to be made on the output detector 24 and the adjustment brackets 36. For example, the central aperture 56 in the weighbridge enables access to the output detector 24 while corner apertures 58 enable access to the sensitivity adjustment bracket 36 in each corner of the housing structure 22.

Referring now to FIGS. 2 and 3. The sensitivity adjustment bracket 36 together with its interconnection between the load struts 16 and 18 and the arm system is shown in greater detail. As all four corners are substantially identical only one of the corners will be described.

The sensitivity adjustment bracket 36 is generally L-shaped and includes a horizontal arm 62 which is spaced above the horizontal top surface 63 of the housing structure 22. The adjustment bracket 36 further contains a vertical arm 64 which extends from one end of the horizontal arm upwardly to just below the weighbridge top plate 48.

A pair of bolts 66 and 68 pass through the end arm 34 with the bolt head resting against the exterior surface of the end arm adjacent the housing side wall 54. The bolts 66 and 68 also pass through the adjustment bracket vertical arm 64. Nuts 72 and 74 are secured to each of the bolts on opposite sides of the vertical arm 64.

The weighbridge 14 is secured to the top surface of the load strut 18 by means of a restraining screw 76. A securing bracket 78 is juxtaposed with the bottom surface of the load strut 18 and extends adjacent to the vertical arm 64, and is spaced therefrom. The securing bracket 78 is also parallel to and spaced above the adjustment bracket horizontal arm 62.

The securing bracket 78 is secured to the load strut 18 by means of a pair of bolts 82 and 84. The securing bracket 78 is movable with respect to the strut 18 as the bolts 82 and 84 pass through slots 86 and 88, respectively, formed in the bracket 78.

The bottom surface of the bracket 78 and the top surface of the adjustment bracket horizontal arm 62 are interconnected by means of a resilient pad 92 which is secured between the bracket 78 and the horizontal arms 62 by means of an adhesive. A similar pad of resilient material 94 is positioned between the top surface 63 of the housing structure 22 and the bottom surface of the end arm 34.

It should be noted that the securing bracket 78, being directly connected by means of the pad 92 to the adjustment bracket 36, is movable therewith by loosening the bolts 82 and 84 and moving the nuts 72 and 74. This adjustment mechanism is used to relieve stress typically formed about the vertical arm 64 of the adjustment bracket.

When a load is placed on the deck plate 12, it is, of course, transferred to the weighbridge and hence to the load struts 16 and 18. This force in turn is detected by the strain sensor formed of pad 92. The strain sensor force in turn is transferred through the adjustment bracket 36 to the end arms 34 which pivot about the pad 94 which forms a fulcrum. The end arms 32 and 34, in turn, are connected via the stiffener arms 26 and 28, respectively, to the output detector 24.

Referring again to FIG. 1, the interconnection of the stiffener arms 26 and 28 to the output detector 24 are shown in greater detail. The stiffener arms 26 and 28 each define a generally hollow square member. A first nose iron 102 extends from the top surface of the bottom portion of the first stiffener arm 26 and a second nose iron 104 extends from the bottom surface of the lower portion of the stiffener arm 28. The nose irons 102 and 104 are secured to the stiffener arms 26 and 28 by means of bolts 98 and 99, respectively. Typically, the nose irons 102 and 104 and the adjacent surfaces of the stiffener arms 26 and 28 have elongated slots (not shown) enabling the nose irons to be longitudinally adjustable with respect to the stiffener arms, and thus allowing equal loading of the scale.

Referring now to FIG. 4, the nose irons 102 and 104 overlap each other in horizontal planes but are spaced apart. The ends of the nose irons 102 and 104 are joined together by a plastic block 105. The block 105 is bonded to the nose iron adjacent surfaces by an adhesive.

A bolt 106 extends through vertically aligned openings 108 and 112 of the nose irons 102 and 104, respectively, and an aperture 113 formed in the block 115. A cone-shaped steel grommet 116 connects the lower end of the bolt 106 to the bottom surface of the nose iron 104. The upper end of the bolt 106 is connected to the output detector 24 which forms a strain gauge transducer. Thus, items to be weighed which are placed on the deck plate 12 are detected by the strain sensors 92 and summed at the output detector 24 via the fulcrum action of the pads 94 through the end arms 32 and 34 and their respective stiffener arms 26 and 28. The output detector 24 in turn can be connected to a conventional readout instrument (not shown). The nose iron openings 102 and 104 and the plastic block aperture 113 are sufficiently large that all forces are transferred to the bolt 106 via the steel grommet 116.

The embodiment of FIGS. 1-4 could, of course, be modified so that a fulcrum pad 94 and a sensor pad 92 are placed at opposite ends of the stiffener arms 26 and 28, with a connection to the adjustment bracket 36. This modification could be used where a narrow scale is desired and wide loads which can fit on the embodiments of FIGS. 1-4 are not being weighed. The load struts would then be placed in the same position as the end arms 16 and 18.

Typically, the sensor pads 92, the fulcrum pads 94 and the block 105 are made of neoprene, silicon rubber or similar resilient material. The pads 92 and 94, and the block 105 are secured to the adjacent metal surfaces by a conventional bonding agent or adhesive which is compatible with the materials. One such bonding agent used is cyanoacrylate adhesive.

What is claimed is:

1. A scale comprising:
   an arm system movable about and fixedly secured to a fulcrum;
   an output detector coupled adjacent to one end of said arm system;
   a load structure for positioning an item to be weighed thereon; and
   a strain sensor fixedly connected adjacent the other end of said arm system and said load structure, said strain sensor and said fulcrum each being formed of a pad of resilient material, each pad being adhesively and permanently affixed to said arm system and said load structure adjacent surfaces.

2. A scale in accordance with claim 1 wherein said arm system pivots about said fulcrum pad.

3. A scale in accordance with claim 1 wherein a sensitivity adjustment bracket is interconnected between said load structure and said fulcrum.

4. A scale in accordance with claim 3 wherein said adjustment bracket enables said strain sensor to be moved with respect to said load structure and said arm system.

5. A scale in accordance with claim 3 and further including a second arm system, said arm system being joined at said ends adjacent said output detector.

* * * * *